(12) United States Patent
Kim

(10) Patent No.: US 8,370,513 B2
(45) Date of Patent: Feb. 5, 2013

(54) METHOD FOR TRANSMITTING AND DOWNLOADING STREAMING DATA

(75) Inventor: Sang-Hyeon Kim, Gyeonggi-do (KR)

(73) Assignee: NHN Business Platform Corporation, Seongnam-si (KR)

( * ) Notice: Subject to any disclaimer, the term of this patent is extended or adjusted under 35 U.S.C. 154(b) by 1184 days.

(21) Appl. No.: 10/541,399

(22) PCT Filed: Jan. 5, 2004

(86) PCT No.: PCT/KR2004/000007
§ 371 (c)(1),
(2), (4) Date: Jul. 1, 2005

(87) PCT Pub. No.: WO2004/066160
PCT Pub. Date: Aug. 5, 2004

(65) Prior Publication Data
US 2006/0174160 A1 Aug. 3, 2006

(30) Foreign Application Priority Data
Jan. 17, 2003 (KR) .................. 10-2003-0003388

(51) Int. Cl.
*H06F 15/16* (2006.01)

(52) U.S. Cl. ........ 709/231; 709/223; 709/224; 709/232; 709/233; 709/230; 370/232; 370/233; 370/234; 370/235

(58) Field of Classification Search .................... 714/18, 714/100, 748, 784; 370/506; 709/230, 231, 709/232; 718/105
See application file for complete search history.

(56) References Cited

U.S. PATENT DOCUMENTS

| | | | | |
|---|---|---|---|---|
| 5,680,400 | A * | 10/1997 | York ............................. | 370/473 |
| 5,956,321 | A * | 9/1999 | Yao et al. ..................... | 370/230 |
| 6,014,698 | A * | 1/2000 | Griffiths ....................... | 709/224 |
| 6,028,608 | A * | 2/2000 | Jenkins ......................... | 345/619 |
| 6,085,252 | A * | 7/2000 | Zhu et al. ..................... | 709/231 |
| 6,339,785 | B1 | 1/2002 | Feigenbaum | |
| 6,389,473 | B1 * | 5/2002 | Carmel et al. ................ | 709/231 |

(Continued)

FOREIGN PATENT DOCUMENTS

| | | |
|---|---|---|
| KR | 2001-0062171 | 7/2001 |
| KR | 2002-0017926 | 3/2002 |
| KR | 2002-0057837 | 7/2002 |
| KR | 2003-0001527 | 1/2003 |

OTHER PUBLICATIONS

"ER: Efficient Retransmission Scheme for Wireless LANs"—Eric Rozner et al, UT, Dec. 2002 http://www.cs.utexas.edu/~erozner/papers/conext07.pdf.*

(Continued)

*Primary Examiner* — Krista Zele
*Assistant Examiner* — Randy Scott
(74) *Attorney, Agent, or Firm* — H.C. Park & Associates, PLC

(57) ABSTRACT

A method for transmitting and downloading streaming data is disclosed. The method comprises (a) establishing connections with a plurality of nodes; (b) sending a request for sub blocks of streaming data to the plurality of nodes where connection is established to download the sub blocks; (c) monitoring download state of the established connections; and (d) redistributing sub Blocks to be downloaded from some of the nodes where connection is established according to the monitoring results; wherein, the step (b) to step (d) are repeated for downloading sub blocks included in next block when all sub Blocks included in a block are downloaded.

31 Claims, 14 Drawing Sheets

U.S. PATENT DOCUMENTS

| | | | |
|---|---|---|---|
| 6,445,679 B1 * | 9/2002 | Taniguchi et al. | 370/232 |
| 7,117,267 B2 * | 10/2006 | Bavadekar | 709/230 |
| 7,272,645 B2 * | 9/2007 | Chang et al. | 709/223 |
| 2002/0002708 A1 * | 1/2002 | Arye | 725/95 |
| 2002/0004369 A1 * | 1/2002 | Kelly et al. | 455/12.1 |
| 2002/0004846 A1 * | 1/2002 | Garcia-Luna-Aceves et al. | 709/245 |
| 2002/0035692 A1 * | 3/2002 | Moriai | 713/189 |
| 2002/0136203 A1 * | 9/2002 | Liva et al. | 370/352 |
| 2003/0154282 A1 * | 8/2003 | Horvitz | 709/226 |
| 2004/0143672 A1 * | 7/2004 | Padmanabham et al. | 709/231 |

OTHER PUBLICATIONS

"Jointly Adaptive Modulation and Packet Retransmission"—Liu et al, John Hopkins Univ., Mar. 2003 1. citeseerx.ist.psu.edu/viewdoc/download?doi=10.1.1.13.pdf.*

First Office Action from the State Intellectual Property Office of the People's Republic of China, dated Feb. 9, 2007, in counterpart China Patent Application No. 2004-80001683.7.

* cited by examiner

METHOD FOR TRANSMITTING AND DOWNLOADING STREAMING DATA

CROSS REFERENCE TO RELATED APPLICATIONS

This application is a U.S. National Phase Application of International Application PCT Application No. PCT/KR2004/00007 filed on Jan. 5, 2004, which claims the benefit of priority from Korean Patent Application No. 10-2003-0003388 filed on Jan. 17, 2003. The disclosures of International Application PCT Application No. PCT/KR2004/00007 and Korean Patent Application No. 10-2003-0003388 are incorporated herein by reference.

FIELD OF THE INVENTION

The present invention relates to a method for transmitting and downloading streaming data, more particularly to a method for transmitting and downloading streaming data through a plurality of distributed nodes.

BACKGROUND OF THE INVENTION

Conventionally, most content data provided through the Internet were small size data such as document or picture. However, as data transmission technology and devices develop, multimedia contents are also widely provided. The multimedia contents are transmitted to user clients through the streaming method.

Conventionally, streaming data were transmitted from one server to user clients.

The streaming data should be transmitted in real time. However, as the streaming data were transmitted from one server to user clients conventionally, transmission delay has occurred frequently when load of the server becomes higher or connection state is unstable. Because the streaming data should be played as soon as they are downloaded, transmission delay affects QoS (Quality of Service) greatly unlike general file download.

As a prior art regarding file download, U.S. Pat. No. 6,339,785 discloses a method for downloading files through multiple servers. According to the U.S. Pat. No. 6,339,785, total file is divided by N and file is downloaded through N servers so that file can be transmitted stably although error occurs in one connection.

However, according to the above file download method, the file is available only after whole data are downloaded. Therefore, the download method of U.S. Pat. No. 6,339,785 can not be applied to streaming data that should be played as soon as they are downloaded.

DETAILED DESCRIPTION OF THE INVENTION

In order to solve the above mentioned problems, the present invention intends to provide a method for transmitting and downloading streaming data through a plurality of nodes.

Another object of the present invention is to provide a method for downloading streaming data stably from plurality of user clients in P2P network and a communication agent program installed in user clients.

Another object of the present invention is to provide a method for downloading streaming data stably in the file transmission system with multiple servers and a communication agent program installed in user clients.

Another object of the present invention is to provide a method for dividing streaming data into blocks and sub blocks and downloading data from plurality of connections.

In order to achieve above-mentioned objects, according to a preferred embodiment of the present invention, there is provided a method for downloading streaming data comprising the steps of: (a) establishing connections with a plurality of nodes; (b) sending a request for sub blocks of streaming data to the plurality of nodes where connection is established to download the sub blocks; (c) monitoring download state of the established connections; and (d) redistributing sub blocks to be downloaded from some of the nodes where connection is established according to the monitoring result; wherein, the step (b) to step (d) are repeated for downloading sub blocks included in the next block when all sub blocks included in a block are downloaded According to the present invention, the step of determining sub blocks to download from each of the nodes where connection is established may be further comprised.

The step (c) may comprise the step of monitoring if there exists a connection where sub block download is completed.

The sub blocks to be downloaded from each of the nodes may be determined by calculating connection state valuation index.

The connection state valuation index may be calculated using information selected from the group consisting of round-trip time with each of the nodes and average download speed from each of the nodes.

The step (d) may comprise the step of redistributing sub blocks between a connection where sub block download is completed and some of the connections where sub block download is not completed when a connection where sub block download is completed exists.

The step (d) may comprise the step of redistributing sub blocks between a connection where sub block download is completed and a connection of which download rate is the lowest among connections where sub block download is not completed.

The step for redistributing sub blocks between a connection where sub block download is completed and a connection of which the download rate is the lowest may comprise the steps of: determining download speed of the connection where the sub block download is completed and the connection of which the download rate is the lowest; determining the number of remaining sub blocks to download in the connection of which the download rate is the lowest; determining if redistribution of sub blocks is necessary; redistributing the remaining sub blocks between the connection where sub block download is completed and the connection of which the download rate is the lowest according to rate of the download speed if sub block redistribution is necessary, According to another embodiment of the present invention, there is provided a communication agent program installed in a plurality user clients in the system where a connection control server and the plurality of user clients are connected through network, comprising: an agent manager module for providing information of contents stored in a user client and identification information of the user client to the connection control server and transmitting contents request information to the connection control server when a user requests contents; a node information manager module for receiving and storing list information of nodes that store requested contents; a connection control module for establishing connections with a plurality of nodes using the list information of nodes, and determining sub blocks to download from each of the nodes where connection is established to request sub blocks, and redistributing sub blocks to download from some of the connected nodes by monitoring download state while downloading sub blocks; a sub block manager module for determining if all sub blocks included in a block are downloaded and requesting sub blocks included in a next block to download sub blocks included in the next block when all sub blocks included in a block is downloaded.

According to another embodiment of the present invention, there is provided a communication agent program installed in user clients downloading streaming data from the system including a plurality of content servers and at least a connection control server, comprising: a data request module for sending a request for transmission of data to the connection control server; a node information manager module for receiving and storing list of content servers from which the requested data are to be downloaded; a connection control module for establishing connections with a plurality of content servers included in the contents server list, and requesting sub blocks of streaming data to download from the content servers where connection is established, and redistributing sub blocks to download in some of the content servers where connection is established by monitoring download state while downloading sub blocks from connected content servers; and a sub block manager module for determining if all sub blocks included in a block are downloaded and requesting sub blocks included in a next block to download sub blocks of the next block when all sub blocks included in a block are downloaded.

According to another embodiment of the present invention, there is provided a connection control server connected with a plurality of user clients through network for controlling connection between the user clients in order for a user client to download streaming data by connecting other user clients, comprising: a mesh manager module for receiving information of contents stored in the connected plurality of user clients and address information of the connected plurality of user clients, and providing information of nodes that store requested contents to a user client which requested contents; and a mesh information database for storing information of contents stored in each of the user clients and address information of each of the user-clients; wherein a communication agent program is installed in the plurality of user clients, the communication agent program controls user clients to establish connections with a plurality of nodes using the node information, and to send a request for sub blocks of streaming data to download to the connected nodes, and to redistribute sub blocks to download by monitoring download state of each of the connected nodes.

According to another embodiment of the present invention, there is provided a connection control server connected with a plurality of user clients and a plurality of content servers through network for controlling connection between the user clients and the content servers in order for a user client to download streaming data by connecting at least two content servers, comprising: a server state determining module for receiving state information from the connected plurality of content servers and determining state of each of the content servers; a server list providing module for providing list information of servers to transmit streaming data of requested contents when receiving contents request information from a user client; wherein a communication agent program is installed in the user clients, the communication agent program controls the user clients to establish connections with at least two content servers using the server list information, and determine sub blocks of streaming data to download from each of the connected content servers to request sub blocks, and to redistribute sub blocks to download by monitoring download state of sub blocks from each of the connected nodes.

BEST MODE FOR CARRYING OUT THE INVENTION

The present invention will be described by virtue of the following embodiments in more detail.

Figure 1:
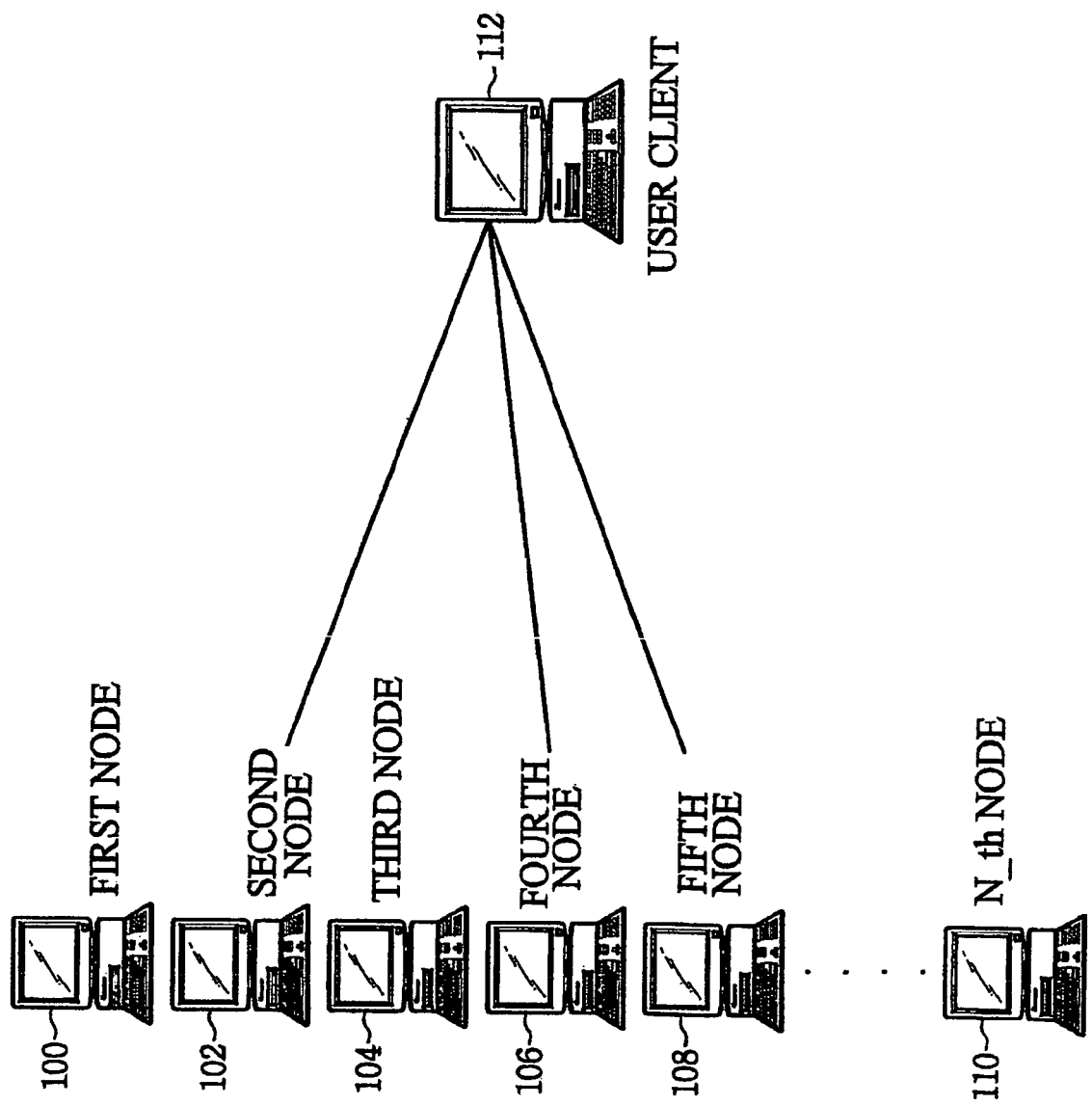
FIG. 1 is a schematic configuration of streaming data transmission system where the present invention is applied.

FIG. 1 is a schematic configuration of streaming data transmission system where the present invention is applied.

Referring to FIG. 1, the streaming data transmission system according to the present invention may comprise a plurality of nodes 100, 102, 104, 106, 108, 110 and a user client 112.

The user client establishes connections with selected plurality of nodes 102, 106, 108 and downloads streaming data.

In FIG. 1, the plurality of nodes 100, 102, 104, 106, 108, 110 store contents data and transmit requested contents data to the user client after receiving contents request information from the user client. The node may be a server that generally transmits contents or other user client.

The user client 112 transmits contents request information to the plurality of nodes and downloads contents data from corresponding nodes 102, 106, 108. In other words, according to the present invention, streaming data are downloaded from plurality of paths through plurality of nodes.

At this time, the user client sends a request for different streaming data to each of the nodes where connection is established and assembles the streaming data downloaded form the plurality of nodes.

Figure 5:
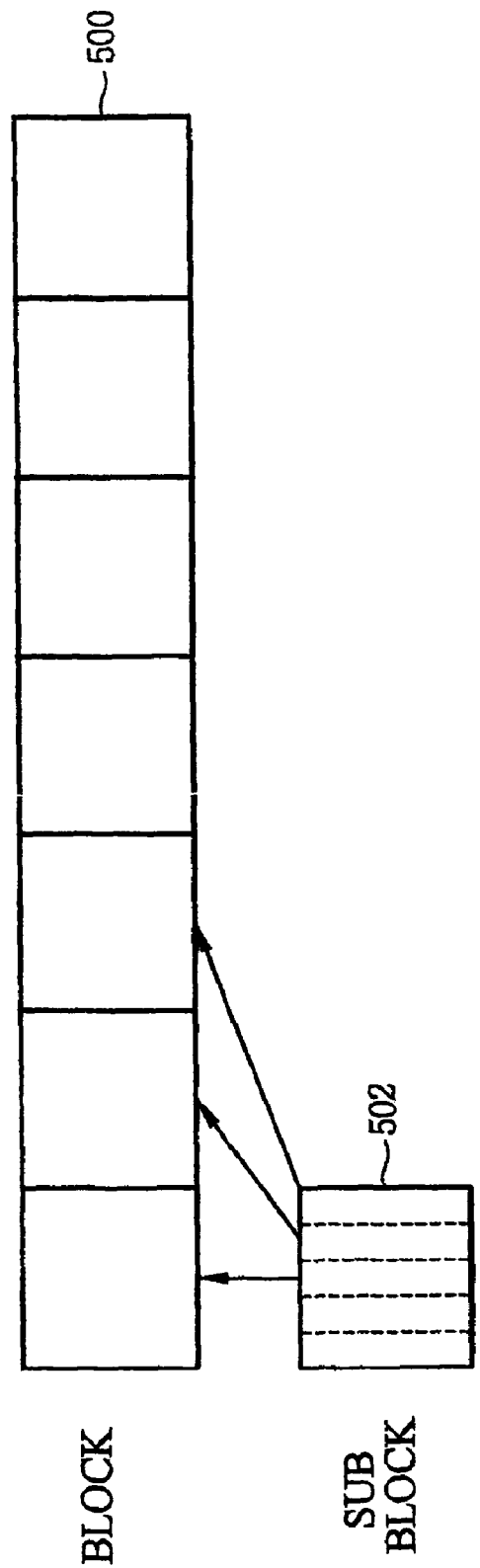
FIG. 5 is a structure of streaming data according to a preferred embodiment of the present invention.

FIG. 5 is a structure of streaming data according to a preferred embodiment of the present invention.

Referring to FIG. 5, the streaming data according to the present invention comprise a plurality of blocks 500 and each of the blocks comprises a plurality of sub blocks 502.

The block and sub block are logical unit for classifying streaming data and it would be obvious to those skilled in the art that other terms can be used.

Unlike general file download, the streaming data should be played while being downloaded. Therefore, general file download method through multiple servers cannot be applied to the streaming data download because conventionally whole file data are divided into N segments and each of the segments is downloaded through multiple paths. According to the conventional file download method using multiple paths, a downloaded file cannot be played until whole file data are downloaded while streaming data should be played as soon as they are downloaded.

Therefore, according to the present invention, whole streaming data are divided into blocks and sub blocks included in a block are downloaded in parallel/distribution method through multi-paths.

For example, in the system of FIG. 1, if one block comprises ten sub blocks, the user client 112 requests 1~3 sub blocks to the second node 102, 4~7 sub blocks to the fourth node 106 and 8~10 sub blocks to the fifth node 108.

If all sub blocks included in a block are downloaded, the user client 112 requests sub blocks included in the next block. After all data of a block are downloaded, sub blocks of the next block are downloaded, and therefore data can be played while being downloaded although data are downloaded in multi-paths.

In FIG. 5, the case where the streaming data are divided into blocks and sub blocks, however, it would be obvious to those skilled in the art that the streaming data can be divided into smaller units than the sub block and can be transmitted by the smaller units.

When the user client sends a request for sub blocks to each of the nodes, the user client determines the connection state of each node. For example, among the second-node 102, the fourth node 106 and the fifth node 108, if the connection state of the second node 102 is the best and the connection state of the fifth node is the worst, the user client 112 sends a request for the maximum number of sub blocks to the second node and minimum number of sub blocks to the fifth node. The method for determining the state of the node and requesting sub blocks according to the result of determination will be explained in more detail referring to another figure.

When sub blocks are downloaded through the multi-paths, sub block download in a connection can be completed earlier than in other, connections, and in this case, data are not transmitted in the connection where sub block download is completed until sub block download is completed in other connections. Idle connection of this type reduces transmission efficiency.

Therefore, according to the present invention, if sub block download is completed in a connection among the plurality of connections, some sub blocks which are not transmitted are downloaded through the connection where the sub block download is completed. The method for redistributing sub blocks to be downloaded when a sub block download is completed in a connection will be explained in more detail referring to another figure.

Figure 2:
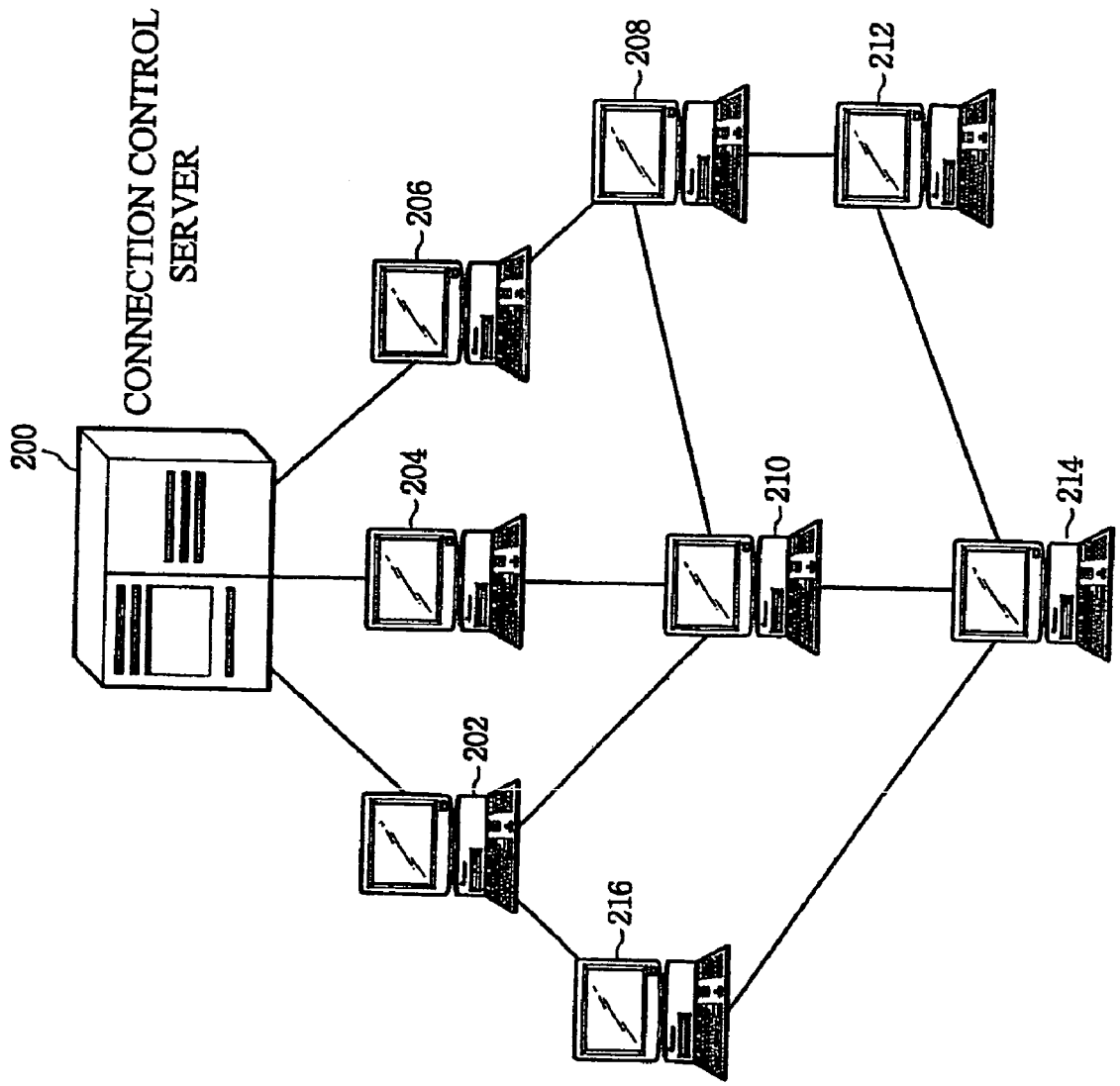
FIG. 2 is an example of network system where the method for transmitting streaming data according to the present invention is applied.

FIG. 2 is an example of network system where the method for transmitting streaming data according to the present invention is applied.

FIG. 2 illustrates a case where streaming data transmission method using P2P (Peer to Peer) is applied.

Referring to FIG. 2, the network system where the present invention is applied may comprise a connection control server 200 and a plurality of clients 202, 204, 206, 208, 210, 212, 214, and 216.

The connection control server 200 receives contents request information from a user client and provides address information of other user clients that store the requested contents to the user client that requested contents in response to the contents request information. The user client that requested contents downloads streaming data of contents through multi-paths using the provided address information.

For example, if a user client 210 requests movie 'A' to the connection control server 200, the connection control server 200 derives address information of user clients that store, movie 'A' and provides the address information to the user client 210 that requested the contents.

The address information may be IP address and port number and it would be obvious to those skilled in the art that other address identification information can be used.

For example, let us assume that the user clients that store the movie 'A' are reference number 202, 204 and 208 in FIG. 2. If the connection control server provides address information of clients 201, 204, 208 to the user client 210 that requested contents, the user client 210 tries connection establishment with the user clients 202, 204, and 208.

If the connection is established, the user client 210 requests different sub blocks to each of the clients 202, 204, 208 where connection is established. If all sub blocks included in a block are downloaded, the user client 210 requests sub blocks included in the next block. The transmitted streaming data are stored in the user client. If other clients request the streaming data, the stored streaming data are transmitted.

A communication agent program for communication with the connection control server or other clients is installed in each of the user clients. In the embodiment of the present invention, the case where the communication agent is computer software is described, however, it would be apparent to those skilled in the art that the communication agent may be an independent device or a card.

If power of a client where the communication agent is installed is on or the communication agent is executed, the agent program transmits information of contents stored in the user client to the connection control server 200 and the connection control server 200 stores the transmitted information.

Figure 3:
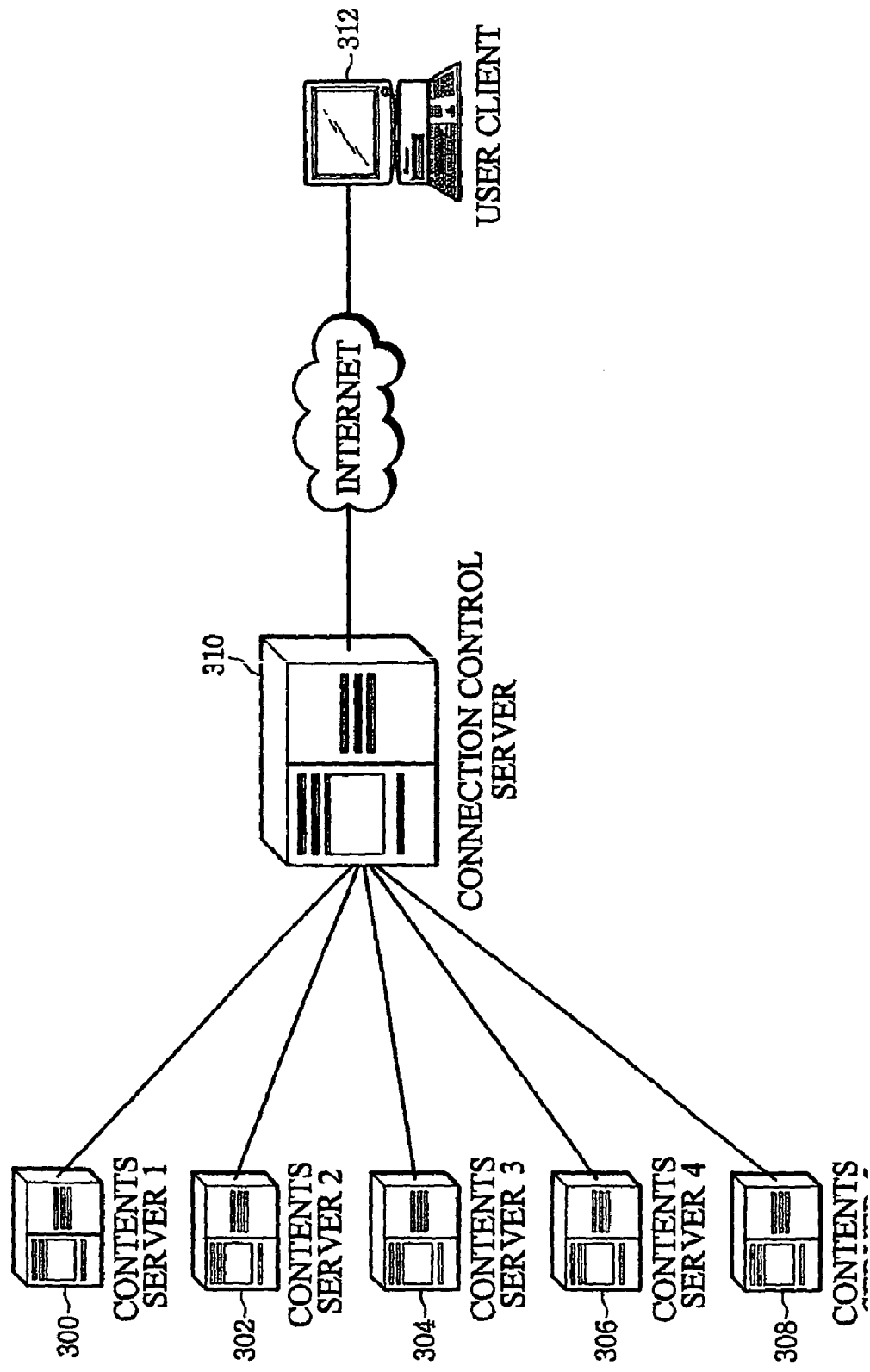
FIG. 3 is another example of network system where streaming data transmission method of the present invention is applied.

FIG. 3 is another example of network system where streaming data transmission method of the present invention is applied.

FIG. 3 illustrates a case where streaming data are provided through multiple servers.

Referring to FIG. 3, the streaming data transmission system according to an embodiment of the present invention may comprise a plurality of content servers 300, 302, 304, 306, 308, a connection control server 310 and a user client 312.

The connection control server 310 receives contents request information from the user client 312 and provides information of servers where the user client should be connected among the plurality of servers 300, 302, 304, 306, 308.

The connection control server 310 receives state information from the plurality of servers 300, 302, 304, 306, 308 periodically and controls the user client to be connected to the servers with good state.

The user client 312 receives server list information from the connection control server 310 and establishes connection with the content servers in the list to download streaming data through multiple paths.

As in the case of FIG. 2, a communication agent program is installed in the user client for downloading streaming data through multiple paths.

Figure 4:
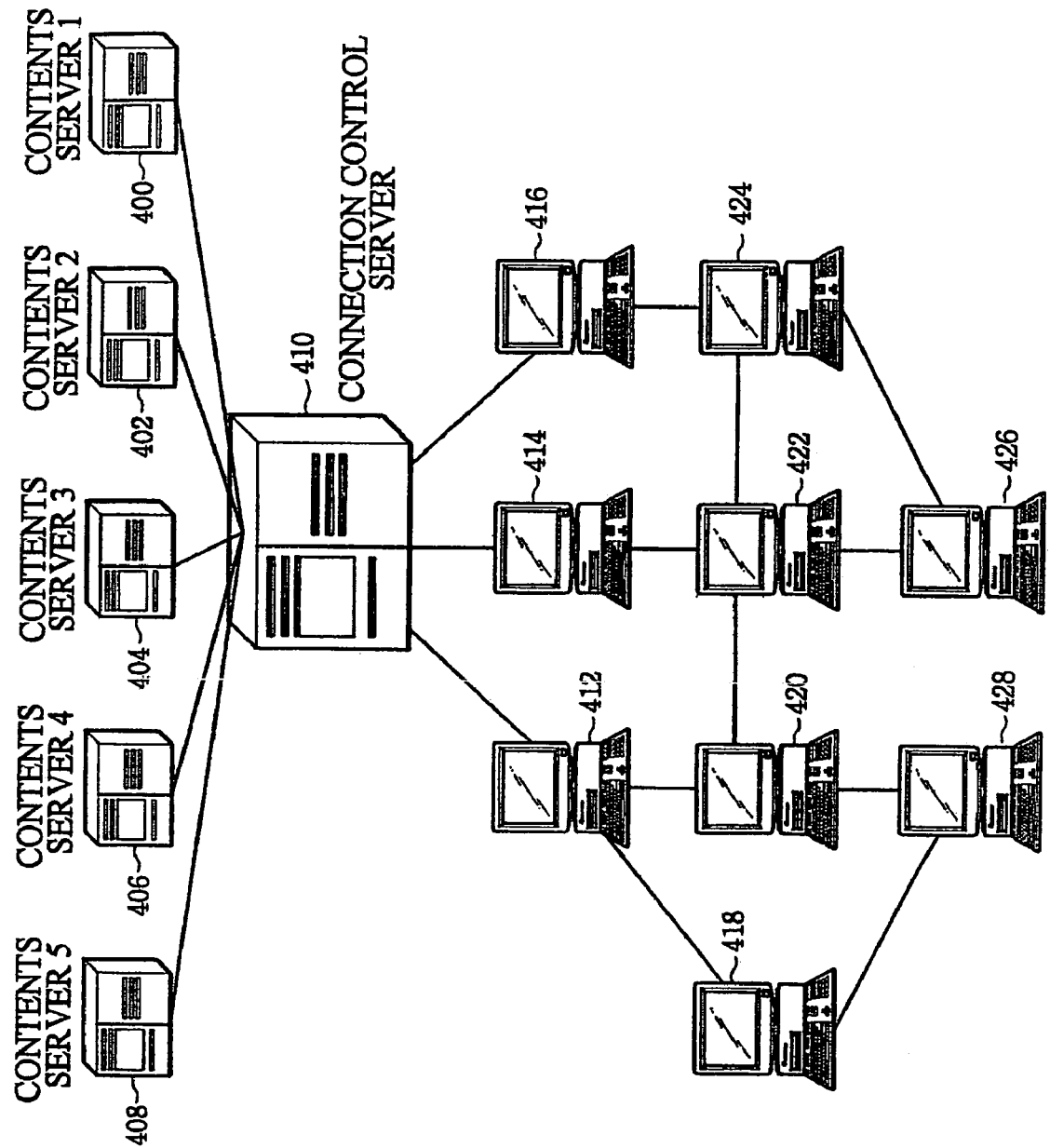
FIG. 4 is another example of network system where streaming data transmission method of the present invention is applied.

FIG. 4 is another example of network system where streaming data transmission method of the present invention is applied.

FIG. 4 is a system where P2P (Peer to Peer) system of FIG. 2 and multiple server system of FIG. 3 are combined.

Referring to FIG. 4, the streaming data transmission system according to a preferred embodiment of the present invention may comprise a connection control server 410, a plurality of content servers 400, 402, 404, 406, 408 and a plurality of clients 412, 414, 416, 418, 420, 422, 424, 426, 428. Although the plurality of content servers are illustrated in FIG. 4, the number of content server can be one unlike FIG. 4.

In FIG. 4, the connection control server 410 receives contents request information from user clients, and provides list information of servers or user clients that store the requested contents.

Like FIG. 2 and FIG. 3, an agent program is installed in the user clients 412, 414, 416, 418, 420, 422, 424, 426, 428 and the agent program transmits contents information stored in the client to the connection control server 410 when power of the client is on or the agent program is executed.

The user client that requested contents establishes connection with contents servers or clients using the list information that is provided by the connection control server 410 and sends a request for different sub blocks to the clients or content servers where connection is established to download streaming data.

In case of FIG. 4, the node list provided by the connection control server 410 can include user clients and server together. For example, if contents data are received from 5 nodes, one node may be a contents server and other 4 nodes are user clients. In this case, according to a preferred embodiment of the present invention, in order to reduce load of the contents server, contents server can be excluded from nodes if download state from user clients besides contents server is good. Further, the number of sub blocks requested to the contents server can be reduced.

In FIG. 2 to FIG. 4, systems which can download streaming data through multiple paths are described. It would be obvious to those skilled in the art that others systems which transmit data through plurality of nodes besides systems of FIG. 2 to FIG. 4 can be applied to the present invention.

Figure 6:
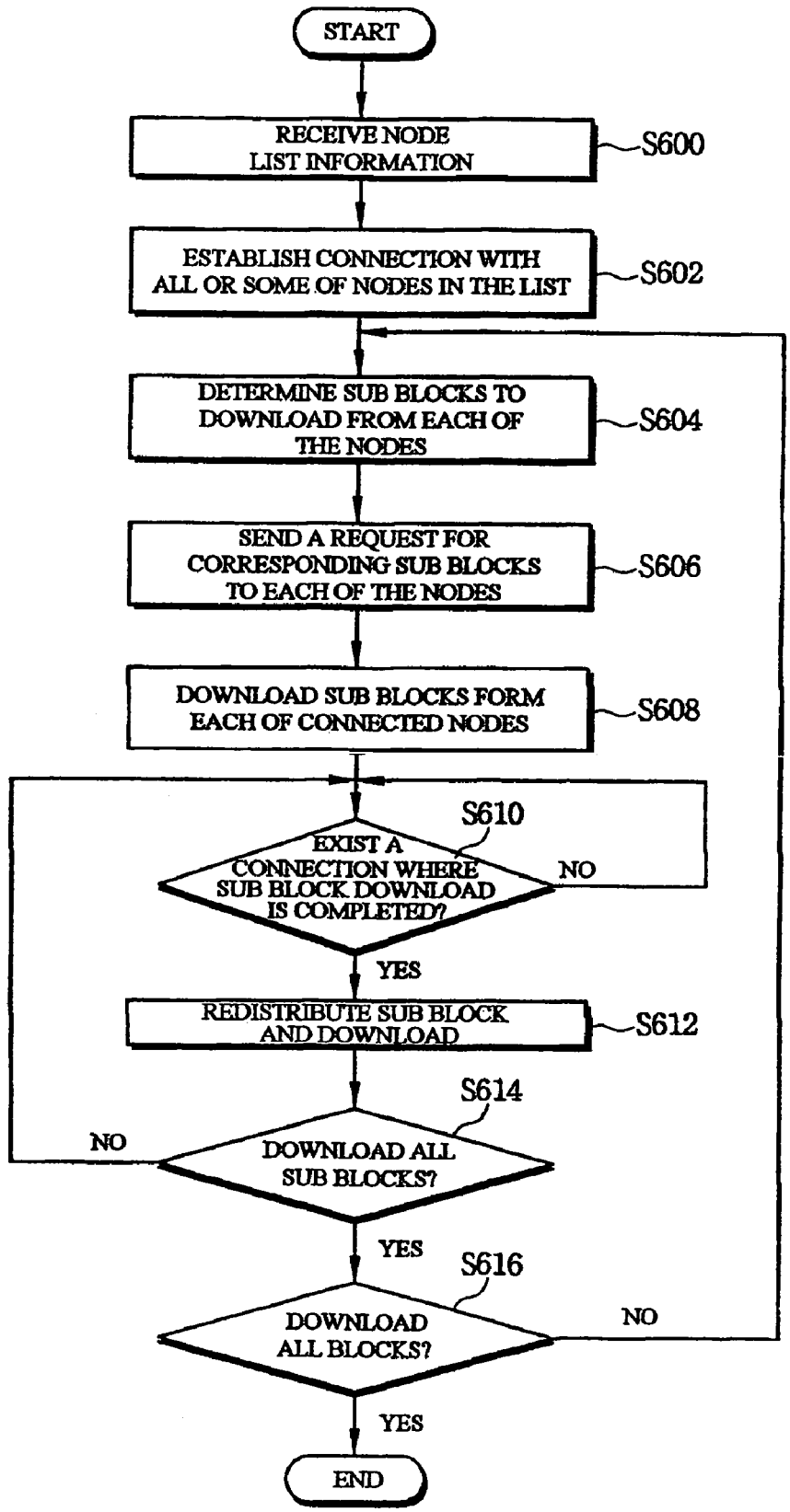
FIG. 6 is a flow chart of streaming data download method according to a preferred embodiment of the present invention.

FIG. 6 is a flow chart of streaming data download method according to a preferred embodiment of the present invention.

Referring to FIG. 6, a user client receives node list information from the connection control server S600. In system of FIG. 2, nodes are user clients that stores contents. In system of FIG. 3, nodes are plurality of content servers, and in system of FIG. 4, nodes can include both of user clients and content server.

If node list information is received, the user client establishes connections with some or all of nodes included in the node list S602. According to a preferred embodiment of the present invention, the user client establishes TCP connection, and other connection establishment method can be used. If connection establishment fails, information of nodes where connection establishment failed is stored in a black list queue, and connection establishment is not tried for nodes stored in the black list queue in following connection establishment.

If connection is established, the user client determines connection state with nodes and determines sub block number to be downloaded form the nodes S604.

According to an embodiment of the present invention, the connection state is determined by round-trip time with each node or download speed from each node.

According to another embodiment of the present invention, sub blocks to be downloaded can be determined without connection state information in initial state of download. For example, if streaming data are downloaded from 3 nodes and one block comprises 15 sub blocks, the user clients requests 5 sub blocks for each of the 3 nodes.

If sub blocks to be downloaded from each of the nodes are determined, the user clients send a request for transmission of sub blocks to the nodes where connection is established. S606. The user client may send a request for sub blocks to all nodes where connection is established or to some of the nodes where connection is established.

The user client downloads sub blocks from nodes where connection is established S608. Although it is not shown in FIG. 6, the user client determines if download error occurs while receiving sub blocks. According to a preferred embodiment of the present invention, occurrence of download error is determined by checking checksum value of sub blocks.

Alternatively, download error can also be determined by checking the checksum value of block after receiving all blocks.

While receiving sub blocks, the user client determines if a connection where all requested sub blocks are downloaded exists S610.

If there exists a connection where all requested sub blocks are downloaded, the user client redistributes sub blocks of which the download is not completed to the connection where sub block download is completed to download redistributed sub blocks from the connection so that the connection where the sub block download is completed does not become idle state.

The user client determines if all sub blocks included in a block are downloaded S614.

If all sub blocks are downloaded, the user client repeats the process that determines numbers of sub blocks in the next block to be downloaded from each of the nodes through multiple paths S604.

The steps from S610 to S614 are repeated until all sub blocks included in a block are received.

As described referring to FIG. 6, according to the present invention, if sub block download is completed in a path (=connection), sub blocks to be downloaded from each of the nodes are redistributed in order to avoid occurrence of idle connection, by which data download efficiency can be improved.

In FIG. 6, a case that sub blocks are redistributed for the nodes that are transmitting streaming data to the user client. However, it would be obvious to those skilled in the art that sub blocks can also be redistributed for the nodes that are not transmitting sub blocks by monitoring the state of nodes to which sub block transmission is not requested.

Further, although it is not shown in FIG. 6, the download mode can be changed so that streaming data are downloaded from a singular server as conventional method if streaming data cannot be downloaded from the plurality of nodes.

Figure 7:
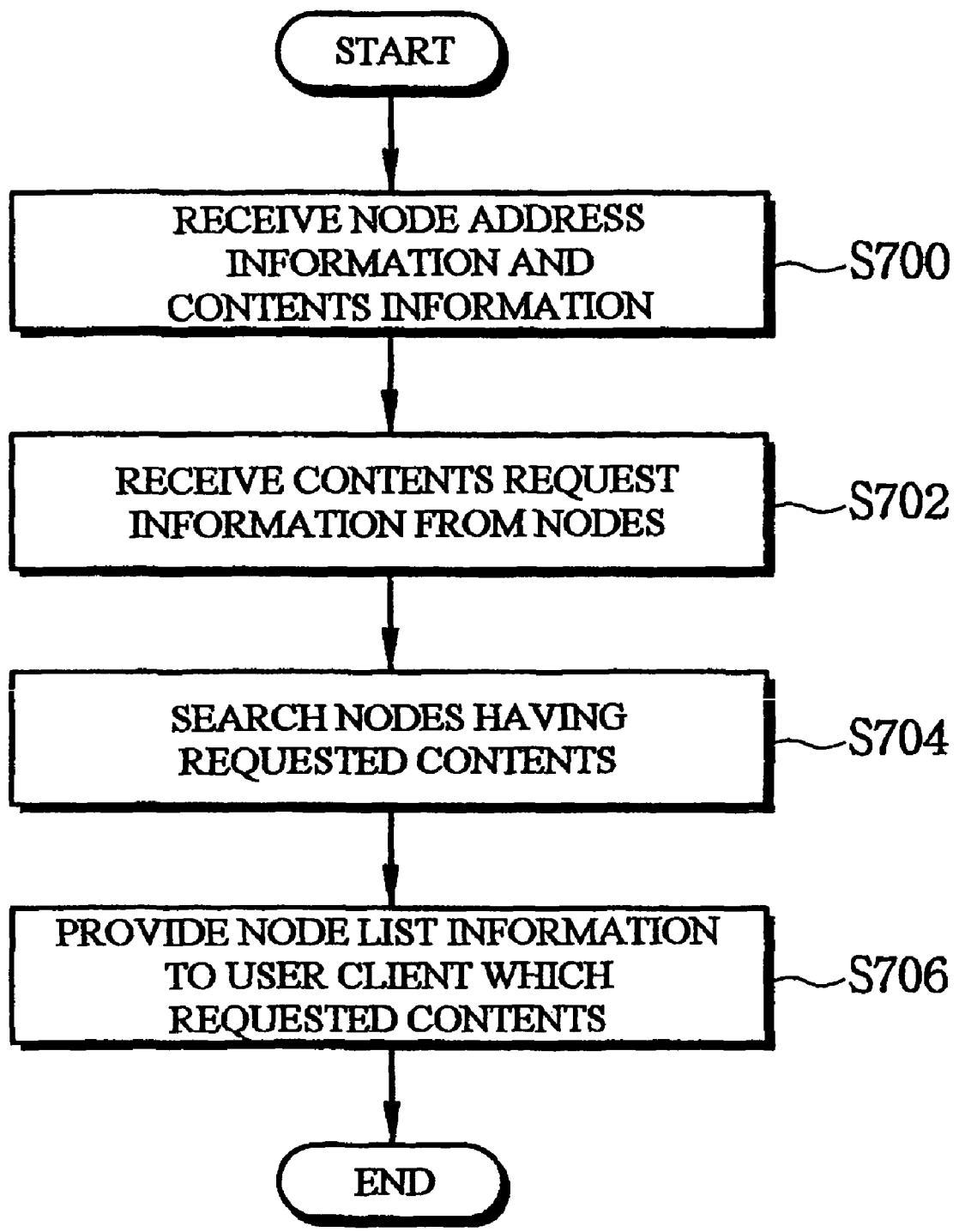
FIG. 7 is a flowchart of operation of the connection control server according to a preferred embodiment of the present invention.

FIG. 7 is a flowchart of operation of the connection control server according to a preferred embodiment of the present invention.

FIG. 7 illustrates operation of the connection control server in P2P network of FIG. 2 or network where P2P and multiple severs are combined.

Referring to FIG. 7, the connection control server receives address information and contents information from the connected nodes S700. As described above, the communication agent program is installed in the each of the user client (node) and the communication agent program transmits information of contents stored in the user client and information of address of the user client to the connection control server. The received node address information and node contents information are stored in the database of the connection control server.

The connection control server receives contents request information from connected nodes S702. Using the information received in step S700, the connection control server that received contents request information searches node that stores the requested contents S704.

The connection control server provides node list information to the user client that requested contents data S706.

Although it is not shown in FIG. 7, the connection control server may also receive node state information (for example, PING information) and may provide received node state information together with the node list information to the user client.

After receiving node list information, the user client selects node where connection is to be established using the state information. If connection establishment fails or data download rate is not good, the user client selects new nodes where connection is to be established using the node state information. The node state information can be updated continuously, the updated information is provided to the user client which requested contents data or is downloading data.

Figure 8:
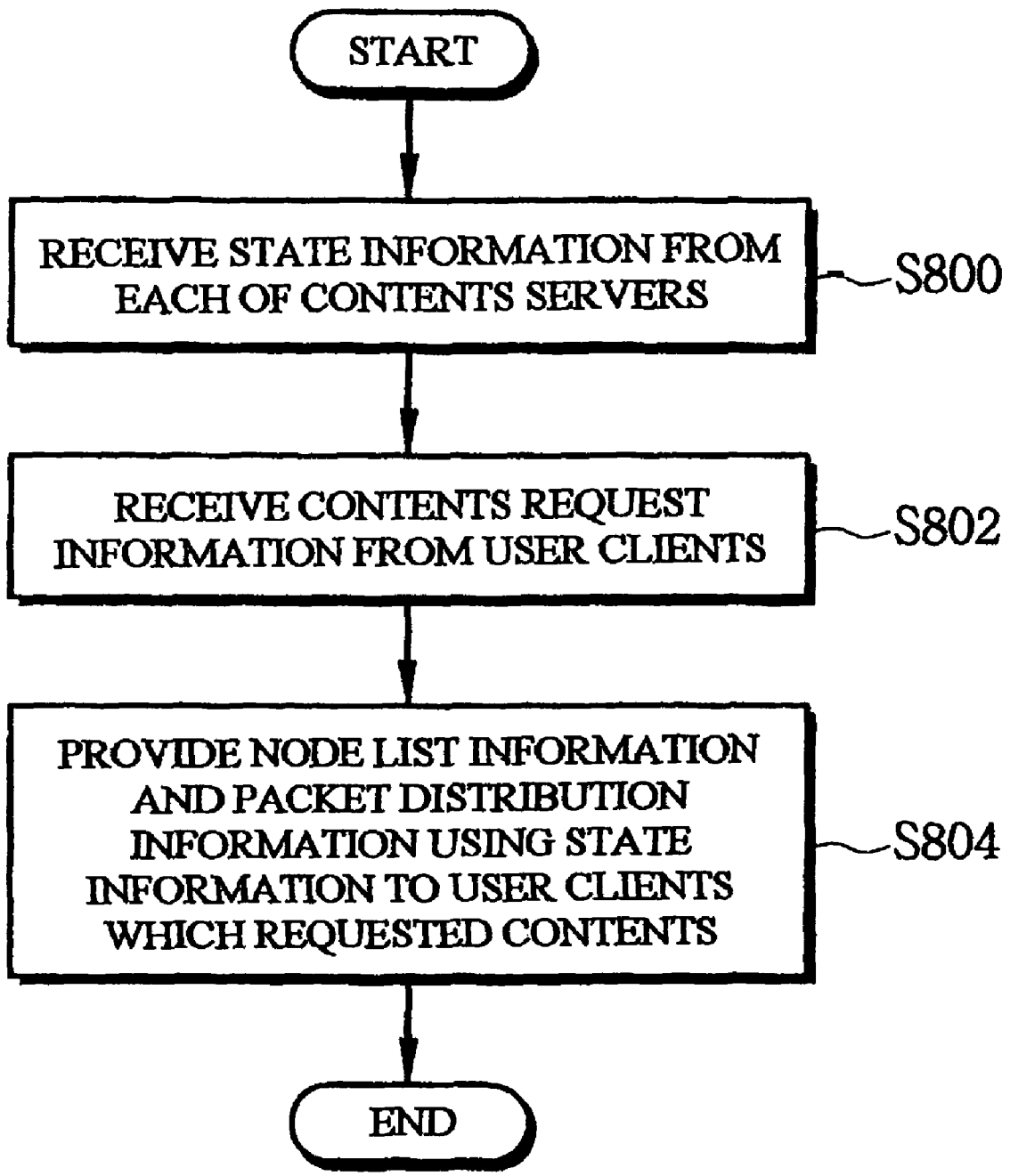
FIG. 8 is a flow chart operation of the connection control server according to another embodiment of the present invention.

FIG. 8 is a flow chart of operation of the connection control server according to another embodiment of the present invention.

FIG. 8 illustrates operation of the connection control server network using multiple servers, such as FIG. 3.

Referring to FIG. 8, the connection control server receives state information from each of the content servers S800. According to a preferred embodiment of the present invention, the state information may be one or combination selected from group comprising bandwidth information, CPU usage rate information, memory usage rate information, the number of users connected, and file I/O information. It would be obvious to those skilled in the art that other information besides above-described information can also be used as the state information of server.

The connection control server receives contents request information from a user client S802.

The connection control server that received contents request information provides address information of servers with good state (in other words, node list information) using the state information in S800 and sub block distribution information (information on which sub blocks to be downloaded from each of the content servers) to the client that requested contents S804.

In FIG. 8, the case that sub block distribution information is transmitted to the user client from the connection control server, however, it would be obvious to those skilled in the art that the client itself can distribute sub blocks to download by checking the connection state after connecting the content servers.

According to another embodiment of the present invention, in initial state of data download, the connection control server provides sub block distribution information. Then, if download of a block data is completed, the user client itself distributes sub blocks to download from each of the content servers in the download of the next sub block because content server can determine download speed with each of the content servers.

Figure 9:
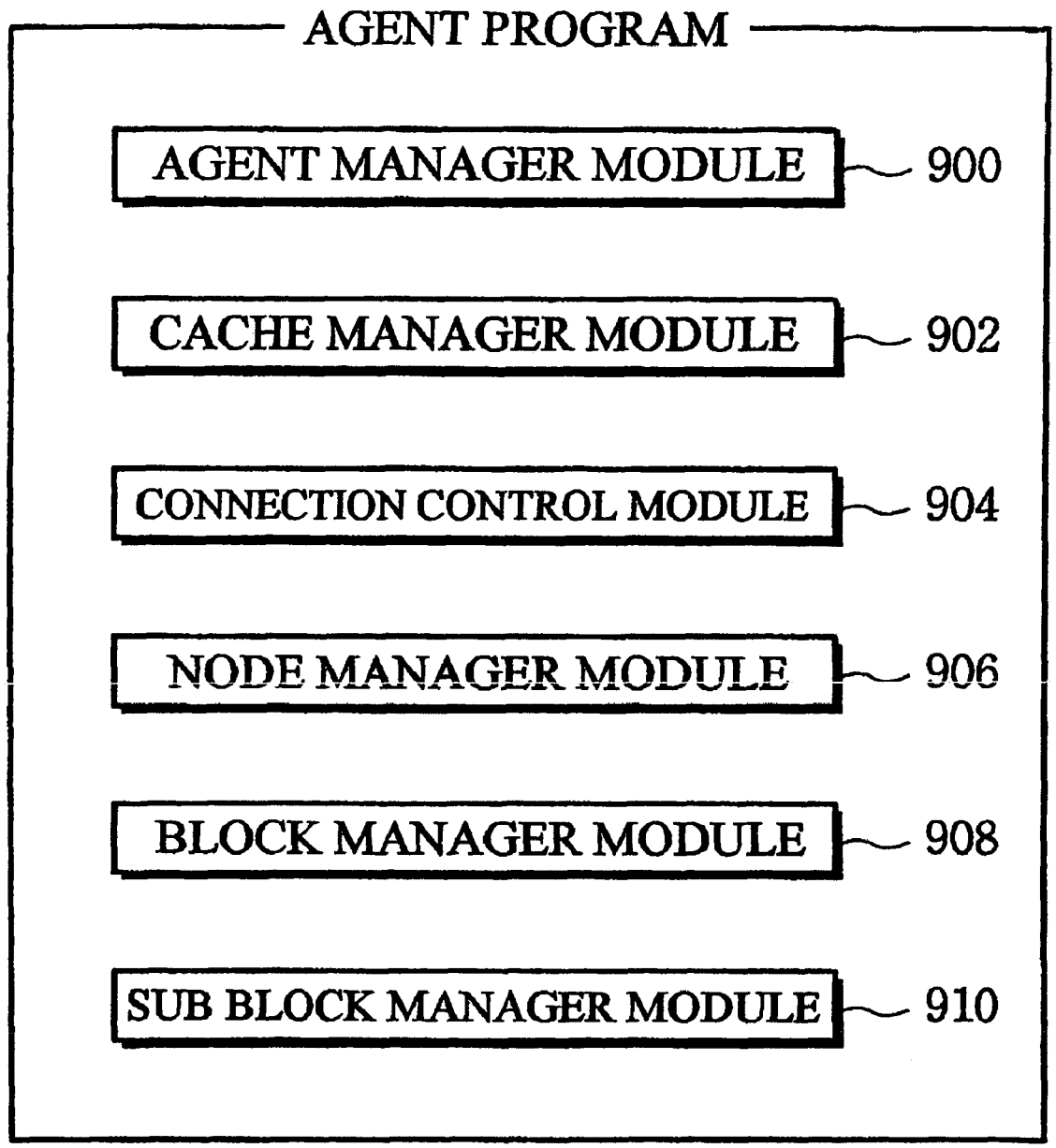
FIG. 9 is a block diagram of agent program installed in the user client according to a preferred embodiment of the present invention.

FIG. 9 is a block diagram of agent program installed in the user client according to a preferred embodiment of the present invention.

Referring to FIG. 9, the communication agent program according to a preferred embodiment of the present invention may comprise an agent manager module 900, a cache manager module 902, a connection control module 904, a node manager module 906, a block manager module 908 and a sub block manager module 910.

In FIG. 9, the agent manager module 900 performs communication with the connection control server and provides user client information including IP address and port number and information of contents stored in the user client to the connection control server when the power of the user client is on or the agent program is executed.

Further, the agent manager module 900 provides contents request information to the connection control server when user requests contents. The agent manager module may provide meta information of the contents to a player which plays contents data when meta information is necessary for play of the requested contents.

The cache manager module 902 manages streaming data downloaded from nodes. The cache manager module 902 provides information for remaining capacity of the cache and information of contents stored in the cache. The cache manager module 902 provides information of contents stored in the cache when power of the user client is on or the agent program is executed. According to a preferred embodiment of the present invention, the cache manager module 902 scrambles the downloaded data when the downloaded data are stored.

The connection control module 904 establishes connections with predetermined number of nodes using the node list information received from the connection control server. The connection control module 904 distributes sub blocks to download from each of the nodes by determining the connection state of nodes and requests sub blocks to each of the nodes according to the distribution result.

Further, the connection control module 904 monitors the download states with each of the nodes continuously, and redistributes sub blocks to download from each of the nodes according to the monitoring result.

According to a preferred embodiment of the present invention, the connection control module 904 monitors if there exists connection where sub blocks download is completed, and the connection control module 904 redistributes sub blocks between the connection where sub block download is completed and some of the connections where sub block download is not completed to avoid idle connection.

According to another embodiment of the present invention, sub blocks can be redistributed previously according to the download state with each of the nodes although the connection where the sub block receipt is not completed does not exist.

According to anther embodiment of the present invention, the connection control module monitors state information of nodes where connection is not established, and redistributes sub blocks between some of the nodes that are transmitting data and some of the nodes that are not transmitting data.

As mentioned above, in the system of FIG. 4, the connection control module requests data to both of the server and the user clients, and if the download state from the user clients is good, the server may be excluded from nodes or small amount of data may be requested to the server in order to reduce load of the server.

The node manager module 906 provides node list information provided from the connection control server to the connection control module 904. As described above, the node list information may include IP address and port number. According to a preferred embodiment of the present invention, the agent manager module 900 requests information of nodes that store the requested contents and provides the node list information to the node manager module 906. The node information is updated continuously because power of nodes may be off or connection state may become instable.

The sub block manager module 910 downloads sub blocks from nodes and determines if all sub blocks included in a block are downloaded. If all sub blocks are downloaded, the sub block manager module 910 provides downloaded block data to the block manager module 908. If the sub block manager module determines all sub blocks included in a block are downloaded, the connection control module requests sub blocks of the next block.

The block manager module 908 provides received block data to a player which plays streaming data or to the cache manager module.

Although it is not shown in FIG. 9, a reservation manager module can be further included in the communication agent program. When streaming data are transmitted with high speed, there may occur a case that the client cannot download data at predetermined speed on account of instability of internet connection state. At this case, the movie data are pre-stored in the cache through the reservation manager module before playing of the movie data and the reservation manager module performs processes for the reservation.

The reservation manager module manages information on streaming data which a user requested for reservation and monitors if the reserved contents are received. The reservation manager module requests data through the connection control module until the download of requested data is completed.

Figure 10:
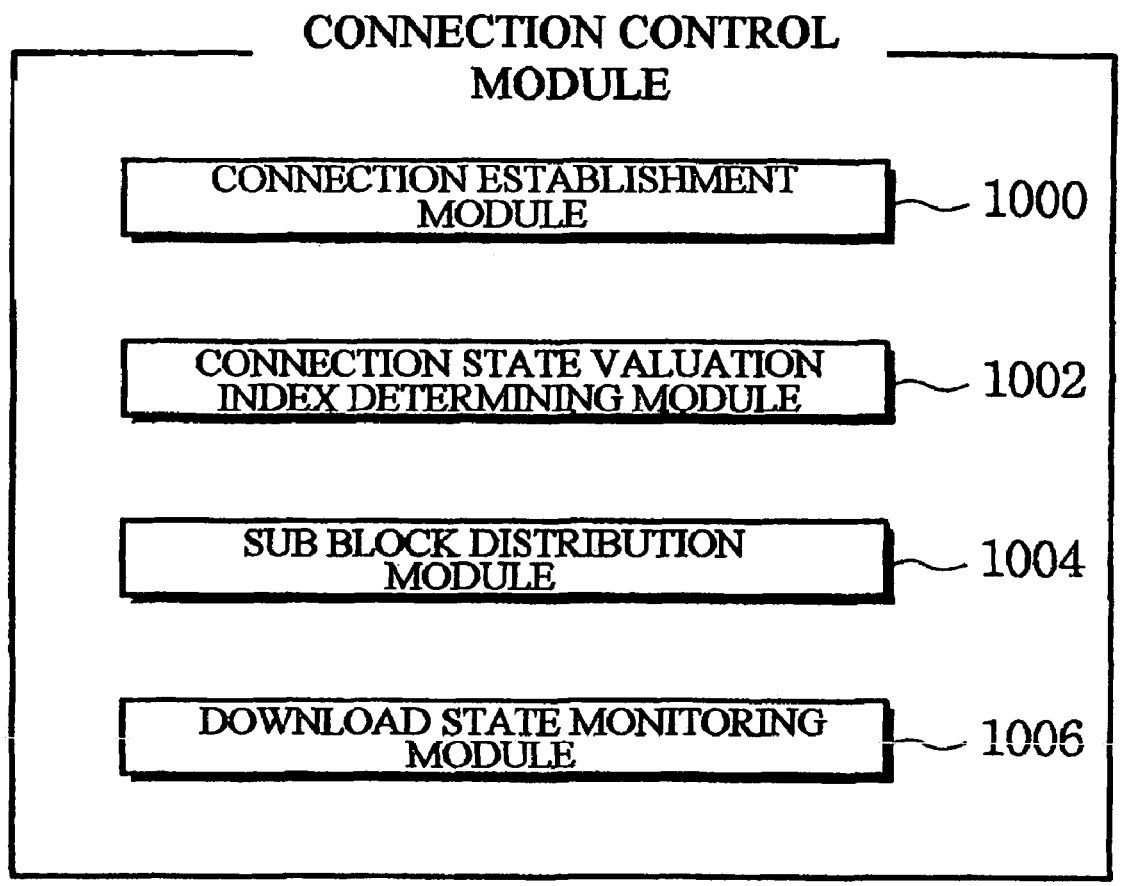
FIG. 10 is a detailed block diagram of the connection control module according to a preferred embodiment of the present invention.

FIG. 10 is a detailed block diagram of the connection control module according to a preferred embodiment of the present invention.

Referring to FIG. 10, the connection control module may comprise a connection establishment module 1000, a connection state determining module 1002, a sub block distribution module 1004 and a download state monitoring module 1006.

The connection establishment module 1000 establishes connections with nodes from which data are to be downloaded using the node list information provided from the connection control server. The connection establishment may comprise following steps;

(i) A user client sends a request for TCP connection to a node.

(ii) The node determines if the TCP connection can be allowed.

(iii) The node allows TCP connection.

As explained above, other connection establishment methods other than TCP can be employed.

The connection state determining module 1002 determines the connection state with each of the nodes. The connection state determining module 1002 calculates connection state valuation index for determining connection state.

According to an embodiment of the present invention, the connection state valuation index may be calculated using round-trip time with each of the nodes.

According to another embodiment of the present invention, the connection state valuation index can be calculated using download speed information from each of the nodes. Alternatively, both of the round-trip time and download speed can be used for calculation of connection state valuation index.

It is desirable that the connection state valuation index is calculated using the round-trip time initially, because download speed is not known initially, and the connection state valuation index is calculated using the download speed after data download is performed. As the download speed changes continuously, the connection state valuation index is also updated depending on the change of download speed.

According to another embodiment of the present invention, the connection state determining module receives information on state of servers from the servers and determines the connection state using the state information.

The sub block distribution module 1004 distributes sub blocks using the connection state valuation index calculated by the connection state determining module 1002. It is preferable that the sub block distribution module 1004 determines the number of sub blocks to download from each of the nodes according to the ratio of connection state valuation index.

The download state monitoring module 1006 determines if there exists a connection where sub block download is completed and requests sub block redistribution to the sub block manager module 1004 when a connection where sub block download is completed exists.

It is not efficient if sub blocks are redistributed for all connected nodes, because control signal should be transmitted to the all nodes. Therefore, according to a preferred embodiment of the present invention, sub blocks are redistributed between a connection where sub block download is completed and a connection of which the download rate is the lowest. At this case, control signal is transmitted to only the node which completed the sub block transmission and the node of which data transmission rate is the lowest.

Figure 11:
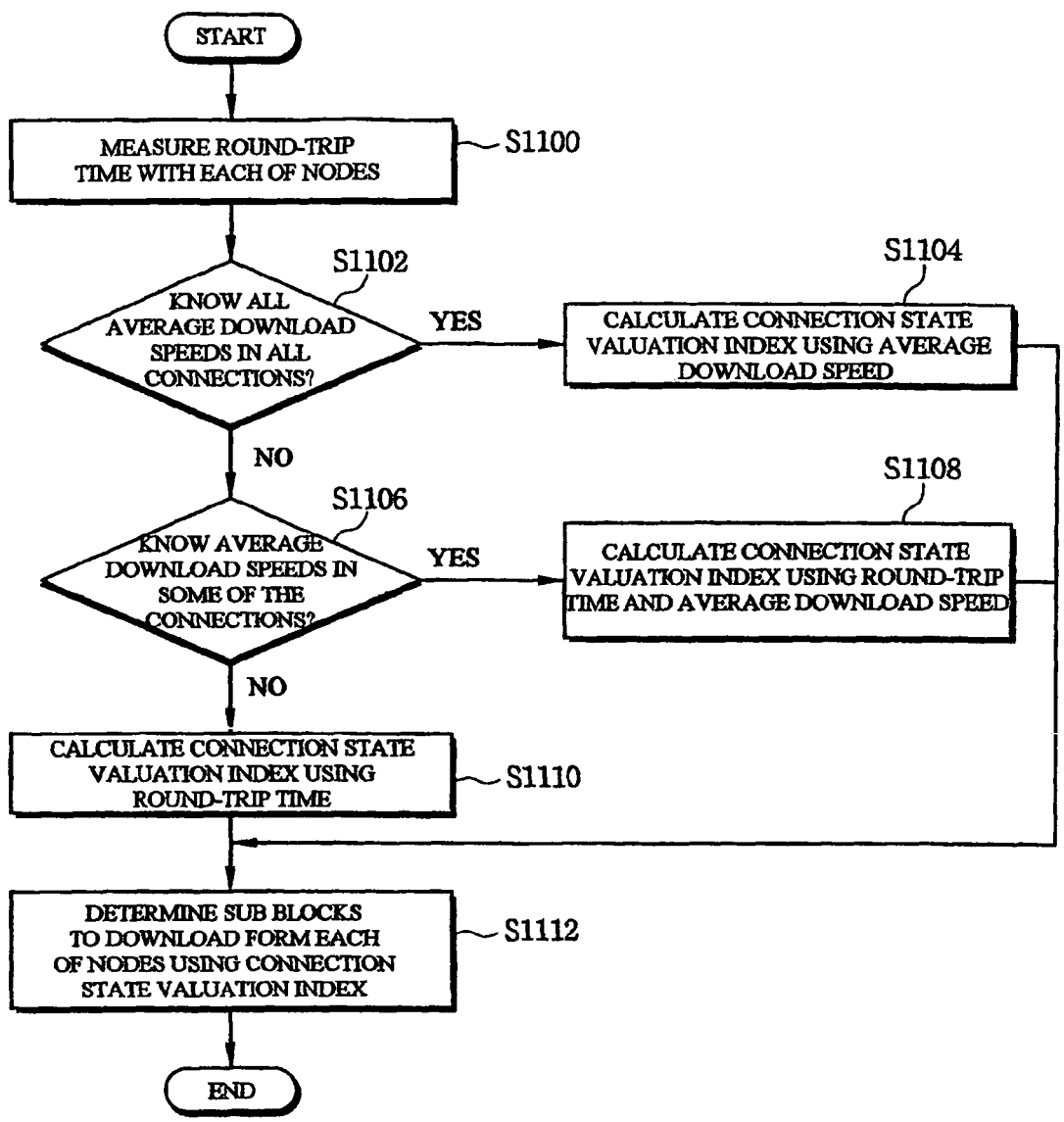
FIG. 11 is a flow chart of process that sub block is redistributed by determining connection state according to a preferred embodiment of the present invention.

FIG. 11 is a flow chart of process that sub block is redistributed by determining connection state according to a preferred embodiment of the present invention Referring to FIG. 11, round-trip times with each of the connected nodes are measured in initial state of download S1100. Round-trip time means time duration between transmitting check signal to a connected node and receiving the response signal of the check signal.

After measuring round-trip signal, it is determined if average download speed can be known in all connections S1102. If several blocks are downloaded, average download speed in all connections can be known.

When average download speed in all connections can be known, the connection state valuation index is calculated using the average download speed information S1104. For example, when streaming data are downloaded from 3 nodes and average download speed of 3 nodes is 500,000 bps, 100,000 bps and 64,000 bps, the connection state valuation index in each connection is 500,000, 100,000 and 64,000 respectively. Normalized value of average download speed can also be used as connection state valuation index.

When average download speed in all connections cannot be known, it is determined if average download speed in some of the connections can be known S1106. This case can occur when streaming data are downloaded from new node while downloading streaming data.

When average download speed can be known in some of the connections, the connection state valuation index is calculated using round-trip time and average download speed S1108.

For example, assuming that streaming data are downloaded from 3 nodes, and average download speed of the first node is 200,000 bps, average download speed of the second node is 100,000 bps and average download speed of the third node is not known. Further, assuming that round-trip time of the first node is 23 ms, round-trip time of the second node is 32 ms and round trip time of the third node is 20 ms.

In this case, the connection state valuation index is calculated by (download speed)/(round-trip time). Average download speed of the third node, is predicted using the value of which the (download speed)/(round-trip time) is the smallest. As the (download speed)/(round-trip time) of the second node is the smallest, the average download speed of the third node is calculated by the following equation 1.

$$\frac{100,000}{20} \times 32 = 160,500 \quad \text{[Equation 1]}$$

If average download speed in all connections cannot be known, the connection state valuation index is calculated using round-trip time. According to an embodiment of the present invention, reciprocal of the round-trip time can be used as the connection state valuation index.

For example, assuming that streaming data are downloaded from 3 nodes and round-trip time of each node is 23 ms, 41 ms and 32 ms. In this case, the connection state valuation index of each node may be ⅟23, ⅟42 and ⅟32 respectively.

After calculation of connection state valuation index, the number of sub block to be downloaded from each of the nodes among all sub blocks is determined.

The number of sub block to be downloaded from each of the nodes determined by the connection state valuation index. In more detail, the number of sub block to be downloaded is determined by the following equation 2.

$$P_i = \left[ \frac{\alpha_i}{\sum_{k=1}^{n} } \times (\text{The number of total sub blocks}) \right], \quad \text{[equation 2]}$$

where $i = 1 \sim n-1$ $$P_i = (\text{The Number of total sub blocks}) - \sum_{k=1}^{n-1} P_i,$$

where $i = n$

Wherein, $P_i$ is the number of sub block to be requested to each of the nodes, as is connection state valuation index in each of the connections. In other words, the user client requests sub block of which the number is $P_i$ to each node.

Figure 12:
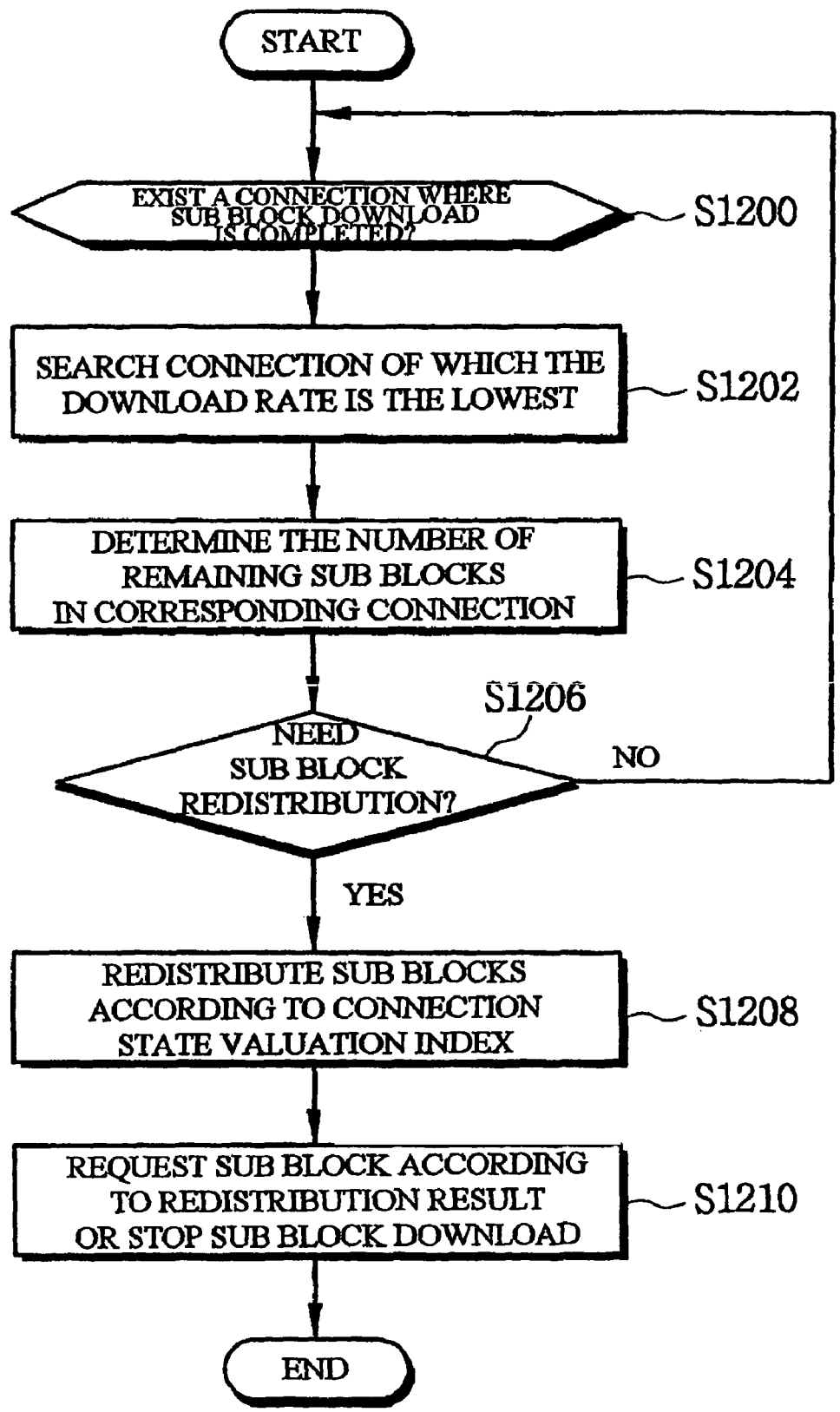
FIG. 12 is a flow chart of process that is performed when there exists a connection where sub block download is completed according to a preferred embodiment of the present invention.

FIG. 12 is a flow chart of process that is performed when there exists a connection where sub block download is completed according to a preferred embodiment of the present invention.

Referring to FIG. 12, the download state monitoring module of the connection control module monitors if there exists a connection where sub block download is completed S1200.

If there exists a connection where sub block download is completed, a connection of which the download rate is the lowest is searched S1202. The download rate can be calculated by (the number of downloaded sub blocks)/(the number of requested sub blocks).

When the connection of which the download rate is the lowest is searched, the number of remaining sub blocks to be downloaded in the connection of which the download rate is the lowest is calculated S1204.

After the calculating the number remaining sub blocks in the connection of which the download rate is the lowest, it is determined if it is necessary to redistribute sub blocks to be downloaded between the connection where sub block download is completed and the connection of which the download rate is the lowest S1206. For example, if remaining sub blocks can be downloaded while transmitting control signal for redistributing sub blocks, redistribution of sub blocks would not be necessary.

If it is determined that redistribution of sub blocks is necessary, the sub blocks to be downloaded from the connection where sub block download is completed and the connection of which the download rate is the lowest is redistributed according to the connection state valuation index S1208.

Sub blocks are may be distributed by the following equation 3.

$$P_1 = \left[ \frac{\alpha_1}{\alpha_1 + \alpha_2} \times (\text{the number of remaining sub blocks}) \right] \quad \text{[equation 3]}$$

$$P_2 = (\text{the number of remaining sub blocks}) - P_1$$

$P_1$ is the number of sub blocks redistributed to the connection of which the download rate is the lowest, $\alpha_1$ is the connection state valuation index of the connection of which the download rate is the lowest, $P_2$ is the number of sub blocks redistributed to the connection where sub block download is completed, and the $\alpha_2$ is the connection state valuation index of the connection where sub block download is completed.

If sub blocks are redistributed, sub blocks are requested to the node corresponding to each connection according to the new distribution result. If it is not necessary to download sub blocks from the connection of which the sub block download rate is the lowest, the user client requests stoppage of the sub block transmission to the corresponding node.

Figure 13:
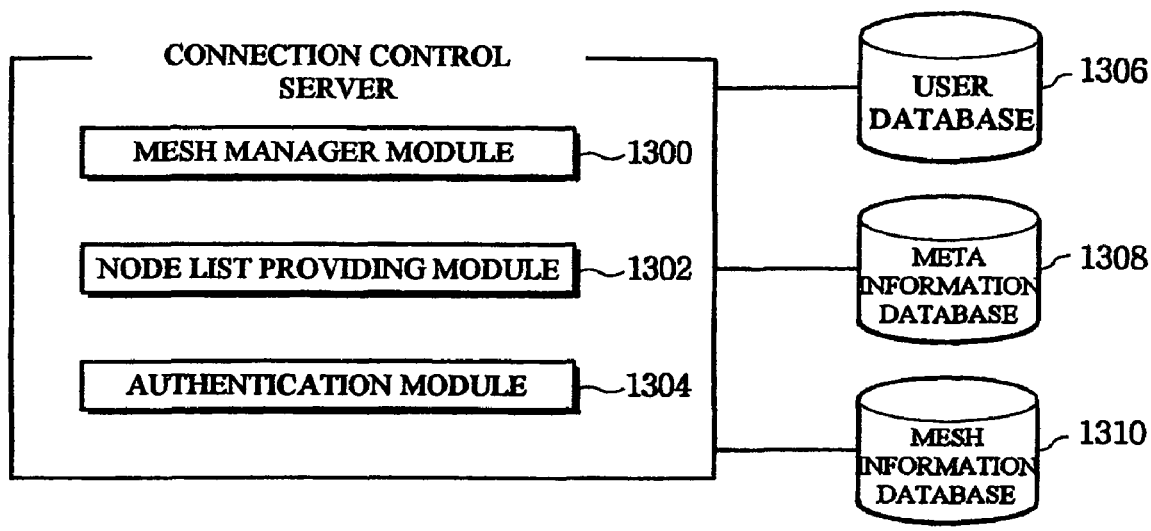
FIG. 13 is a block diagram of module of the connection control-server according to a preferred embodiment of the present invention.

FIG. 13 is a block diagram of module of the connection control server according to a preferred embodiment of the present invention.

FIG. 13 illustrates module of the connection control server in the system of P2P network of FIG. 12 or in the system multiple servers and P2P are combined such as FIG. 4.

Referring to FIG. 13, the connection control server according to an embodiment of the present invention may comprise a mesh manager module 1300, a node information providing module 1302 and an authentication module 1304. A user database 1306, a meta information data base 1308 and mesh information database may be coupled to the connection control server.

In FIG. 13, the mesh manager module 1300 manages information on user clients connected to the connection control server. As described above, when the power of the user client is on or the communication agent program is executed, client address information and information of contents stored in the client are transmitted to the connection control server, and the mesh manager module 1300 receives the information and stores it in the mesh information database 1310.

When a user requests specific contents, the node list providing module 1302 derives information of nodes that store the corresponding contents using the mesh information database 1310 and provides the derived information to the user client.

The authentication module 1304 authenticates users and processes billing information. When a user requests contents, authentication key information including user ID and password is transmitted to the connection control server, and the authentication module 1304 determines if the user is a registered user. Further, the authentication module 1304 determines if the user has paid for the contents by the communication with external billing server.

ID of registered users, password, personal information, etc. are stored in the user database 1306, and contents coding method, information of author, etc. is stored in the meta information database 1308. If the user who requests contents is authorized, the mesh manager module 1300 provides meta information to the user. Generally, meta information is necessary for play of the streaming data, however, if play of streaming data is possible without meta information, the meta information database 1308 may not be coupled to the connection control server.

Information of user clients connected to the connection control server and information of contents stored in each of the user clients are stored in the mesh information database 1310.

Figure 14:
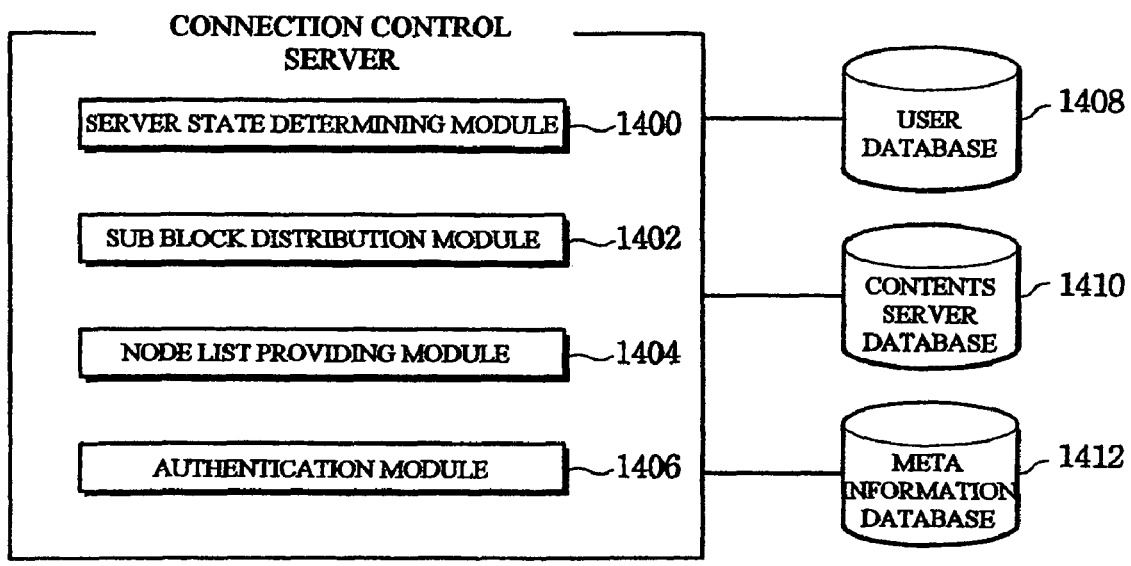
FIG. 14 is a block diagram of the module of the connection control server according to another embodiment of the present invention.

FIG. 14 is a block diagram of the module of the connection control server according to another embodiment of the present invention.

Referring to FIG. 14, the connection control server may include a server state determining module 1400, a sub block distribution module 1402, a server list providing module 1404 and an authentication module 1406. A user database 1408, contents server database 1410 and meta information database 1412 may be coupled to the connection control server.

The server state determining module determines state information of content servers which are managed by the connection control server. As described above, the server state determining module 1400 uses information including bandwidth, CPU usage rate, memory usage rate, the number of connected users, and file I/O, etc. in order to determine state of each of the content servers.

The server list providing module 1404 provides list information of content servers which the user client requesting contents should connect to. The server list providing module provides list of servers with good state using the determination result of the server state determining module.

The sub block distribution module 1402 provides information of the number of sub blocks to be downloaded from each of the content servers using the state information of the content servers to the user client which requested contents.

Information of content servers which the connection control server manages is stored in the content server database 1410.

Function of the authentication module 1406 and information stored in the user database 1408 and meta information database 1412 are same as the case of FIG. 13.

INDUSTRIAL APPLICABILITY

As described above, according to the present invention, stable streaming service can be provided although error occurs in a connection, because streaming data are provided through multiple paths.

Further, according to the present invention, download efficiency can be improved by avoiding occurrence of idle connection because sub blocks to be downloaded are redistributed if sub block download in a connection is completed.

Especially, the present invention is useful when streaming data are downloaded through the plurality of nodes in P2P network.

What is claimed is:

1. A method for downloading streaming data comprising:
establishing connections between a user client and a plurality of nodes, the plurality of nodes comprising a first node and a second node;
dividing streaming data into a plurality of blocks for sequential download, the blocks comprising a first block and a second block;
dividing the first block into a plurality of sub blocks;
determining first sub blocks of the first block to download from the first node and second sub blocks of the first block to download from the second node;
sending a request to the nodes to download determined ones of the sub blocks to the user client, in parallel;
monitoring the downloading of the sub blocks from the nodes to the user client, through the established connections;
determining whether a download of the second sub blocks from the second node is finished;
determining an un-downloaded portion of the first sub blocks; and
maintaining a download of a first portion of the un-downloaded portion of the first sub blocks from the first node and redistributing a second portion of the un-downloaded portion of the first sub blocks to the second node in response to a determination that the download of the second sub blocks from the second node is finished, a ratio of the first portion of the un-downloaded portion to the second portion of the un-downloaded portion being determined according to a ratio of the connection state valuation index for the first node to the connection state valuation index for the second node,
wherein the sending, the monitoring, and the redistributing are repeated for downloading sub blocks included in the second block, when downloading of the first block is completed, and
wherein the ratio of the connection state valuation index for the first node to the connection state valuation index for the second node is determined based on at least one of a ratio between a round trip time between the user client and the first node and a round trip time between the user client and the second node and a ratio between an average download speed from the first node to the user client and an average download speed from the second node to the user client.

2. The method of claim 1, wherein the monitoring of the downloading comprises determining which of the nodes are finished downloading.

3. The method of claim 1, wherein the plurality of sub blocks are assigned to the nodes based on a round-trip time with each of the nodes, an average download speed from each of the nodes, or a combination thereof.

4. The method of claim 1, wherein if the first node has a lowest download rate among the connected nodes, the redistributing is based on the download rate of the first node and the number of un-downloaded sub blocks of the first node.

5. The method of claim 1, further comprising storing information of nodes with which the connection establishment failed in a black list queue.

6. The method of claim 1, further comprising receiving node state information, wherein the first sub blocks and the second sub blocks are determined using the node state information.

7. The method of claim 1, wherein the plurality of sub blocks to be downloaded from each of the nodes are assigned according to: state information of the nodes in an initial state of download, after a determination of download speed from each of the nodes; and by using a connection state valuation index that is calculated using a round-trip time with each of the nodes, an average download speed from each of the nodes, or a combination thereof.

8. The method of claim 6, wherein the connection establishment with the nodes is performed using state information of the nodes.

9. The method of claim 1, further comprising determining a downloading error using a checksum value of the downloaded sub blocks.

10. The method of claim 1, further comprising sending a request to download the redistributed sub blocks.

11. The method of claim 1, further comprising downloading streaming data by connecting to a singular server, if the sub block downloading fails.

12. A non-transitory computer-readable storage medium comprising an executable program, which when executed, downloads streaming data by performing the following steps:
   establishing connections between a user client and a plurality of nodes, the plurality of nodes comprising a first node and a second node;
   dividing streaming data into a plurality of blocks for sequential download, the blocks comprising a first block and a second block;
   dividing the first block into a plurality of sub blocks;
   determining first sub blocks of the first block to download from the first node and second sub blocks of the first block to download from the second node;
   sending a request to the nodes to download determined ones of the sub blocks to the user client, in parallel;
   monitoring the downloading of the sub blocks from the nodes to the user client, through the established connections;
   determining whether a download of the second sub blocks from the second node is finished;
   determining an un-downloaded portion of the first sub blocks; and
   maintaining a download of a first portion of the un-downloaded portion of the first sub blocks from the first node and redistributing a second portion of the un-downloaded portion of the first sub blocks to the second node in response to a determination that the download of the second sub blocks from the second node is finished, a ratio of the first portion of the un-downloaded portion to the second portion of the un-downloaded portion being determined according to a ratio of the connection state valuation index for the first node to the connection state valuation index for the second node,
   wherein the sending, the monitoring, and the redistributing are repeated for downloading sub blocks included in the second block, when downloading of the first block is completed, and
   wherein the ratio of the connection state valuation index for the first node to the connection state valuation index for the second node is determined based on at least one of a ratio between a round trip time between the user client and the first node and a round trip time between the user client and the second node and a ratio between an average download speed from the first node to the user client and an average download speed from the second node to the user client.

13. The storage medium of claim 12, wherein the plurality of sub blocks are assigned based on a connection state valuation index that is calculated using a roundtrip time with each of the nodes, an average download speed from each of the nodes, or a combination thereof.

14. The storage medium of claim 12, further comprising receiving node state information, wherein the plurality of sub blocks are assigned to each of the nodes based on node state information.

15. The storage medium of claim 14, wherein the establishing of the connection with the nodes is performed using the node state information.

16. The storage medium of claim 12, wherein the plurality of sub blocks are assigned based on: state information of the nodes in an initial state of download, after a determination of download speed from each of the nodes; and by using a connection state valuation index that is calculated using a round-trip time with each of the nodes, an average download speed from each of the nodes, or a combination thereof.

17. The storage medium of claim 12, wherein the monitoring of the downloading comprises monitoring the completion of downloading for each of the nodes.

18. The storage medium of claim 17, wherein the first node has the lowest download rate among the nodes.

19. The storage medium of claim 12, wherein the redistributing of the un-downloaded portion of the first sub blocks is based on the download rate and the number of un-downloaded sub blocks assigned to the first node.

20. The storage medium of claim 12, further comprising storing information of nodes with which the connection establishment failed, in a black list queue.

21. The storage medium of claim 12, further comprising determining a downloading error using a checksum value of the downloaded sub blocks.

22. The storage medium of claim 12, further comprising sending a request to download the redistributed sub blocks.

23. The storage medium of claim 12, further comprising downloading streaming data by connecting to a singular server, if the sub block downloading fails.

24. A method for downloading streaming data comprising:
   establishing connections with a first node and a second node among multiple nodes;
   obtaining a first connection state valuation index for the first node based on at least one of a round-trip time between a user client and the first node and an average download speed from the first node to the user client;
   obtaining a second connection state valuation index for the second node based on at least one of a round-trip time between a user client and the second node and an average download speed from the second node to the user client;
   determining a first portion of streaming data for the first node and a second portion of the streaming data for the second node, based on the first connection state valuation index and the second connection state valuation index;
   sending a first request to the first node to transmit the first portion of the streaming data, and a second request to the second node to transmit the second portion of the streaming data, in parallel;
   receiving the first portion of the streaming data from the first node, and the second portion of the streaming data from the second node;

monitoring a download state of the first portion of the streaming data and a download state of the second portion of the streaming data;

determining an un-downloaded portion of the first portion of the streaming data in response to a determination that the download state of the second portion of the streaming data satisfies a determined condition;

recalculating a first recalculated connection state valuation index for the first node and a second recalculated connection state valuation index for the second node in response to the determination that the download state of the second portion of the streaming data satisfies the determined condition;

determining a first portion of the un-downloaded portion for the first node and a second portion of the un-downloaded portion for the second node, a ratio of the first portion of the un-downloaded portion to the second portion of the un-downloaded portion being determined according to a ratio of the first recalculated connection state valuation index to the second recalculated connection state valuation index; and receiving the first portion of the un-downloaded portion from the first node, and receiving the second portion of the un-downloaded portion from the second node.

25. The method of claim 24, wherein a connection state valuation index comprises a value that is proportional to an average download speed and/or a value that is proportional to a reciprocal of a round-trip time.

26. The method of claim 24, wherein the first portion of the streaming data for the first node comprises a first portion of a first block of the streaming data, and the second portion of the streaming data for the second node comprises a second portion of the first block of the streaming data, wherein the first portion of the first block and the second portion of the first block comprise one or more sub blocks of the streaming data.

27. The method of claim 25, wherein a streaming of a second block of the streaming data is initiated if all sub blocks included in the first block are downloaded.

28. The method of claim 25, wherein a number of sub blocks included in the first portion of the streaming data is proportional to the first connection state valuation index, and a number of sub blocks included in the second portion of the streaming data is proportional to the second connection state valuation index.

29. The method of claim 25, wherein a number of sub blocks included in the first portion of the un-downloaded portion is proportional to the first recalculated connection state valuation index, and a number of sub blocks included in the second portion of the un-downloaded portion is proportional to the second recalculated connection state valuation index.

30. The method of claim 25, further comprising determining whether a download of the second portion of the streaming data is finished, wherein determining the un-downloaded portion of the first portion of the streaming data is performed in response to a determination that the download of the second portion of the streaming data is finished.

31. A method for downloading streaming data comprising:

establishing connections between a user client and a plurality of nodes, the plurality of nodes comprising a first node, a second node, and a third node;

determining first sub blocks of a first block to download from the first node and second sub blocks of the first block to download from the second node;

sending a request to the nodes to download determined ones of the sub blocks to the user client, in parallel;

monitoring the downloading of the sub blocks from the nodes to the user client, through the established connections;

determining an un-downloaded portion of the first sub blocks based on a download state of the second sub blocks; and downloading the un-downloaded portion of the first sub blocks using at least two nodes of the first node, the second node, and the third node, wherein a redistribution of the un-downloaded portion of the first sub blocks being determined according to a ratio between connection state valuation indexes for the at least two nodes, wherein a connection state valuation index for a node is determined based on at least one of a round trip time between the user client and the node and an average download speed from the node to the user client.

* * * * *